United States Patent
Brehm et al.

(10) Patent No.: US 11,043,330 B2
(45) Date of Patent: Jun. 22, 2021

(54) ELECTRICAL COMPONENT

(71) Applicant: SIEMENS AKTIENGESELLSCHAFT, Munich (DE)

(72) Inventors: Holger Siegmund Brehm, Erlangen (DE); Matthias Boehm, Neuendettelsau (DE); Daniel Schmitt, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 938 days.

(21) Appl. No.: 15/120,223

(22) PCT Filed: Feb. 26, 2014

(86) PCT No.: PCT/EP2014/053730
§ 371 (c)(1),
(2) Date: Aug. 19, 2016

(87) PCT Pub. No.: WO2015/127968
PCT Pub. Date: Sep. 3, 2015

(65) Prior Publication Data
US 2017/0084387 A1 Mar. 23, 2017

(51) Int. Cl.
| | |
|---|---|
| *H01F 29/12* | (2006.01) |
| *H01C 7/12* | (2006.01) |
| *H01F 27/40* | (2006.01) |
| *H01F 38/02* | (2006.01) |
| *H01C 7/00* | (2006.01) |
| *H01G 7/00* | (2006.01) |

(52) U.S. Cl.
CPC ............... *H01F 29/12* (2013.01); *H01C 7/12* (2013.01); *H01F 38/023* (2013.01); *H01C 7/008* (2013.01); *H01G 7/00* (2013.01)

(58) Field of Classification Search
CPC .... H01F 27/40; H01F 2027/406; H01F 29/12; H01C 7/12
See application file for complete search history.

(56) References Cited

U.S. PATENT DOCUMENTS

| | | | | |
|---|---|---|---|---|
| 3,140,458 A | * | 7/1964 | Willecke | H01F 30/08 336/195 |
| 3,519,972 A | * | 7/1970 | Merrill | H01H 37/765 337/407 |
| 3,956,725 A | * | 5/1976 | Merrill | H01H 37/64 337/407 |

(Continued)

FOREIGN PATENT DOCUMENTS

| | | |
|---|---|---|
| CN | 101036243 A | 9/2007 |
| DE | 102009057288 A1 | 6/2011 |

(Continued)

*Primary Examiner* — Elvin G Enad
*Assistant Examiner* — Malcolm Barnes
(74) *Attorney, Agent, or Firm* — Laurence Greenberg; Werner Stemer; Ralph Locher (57) ABSTRACT

An electrical component includes a conductor having a plurality of conductor sections. The conductor sections are electrically short-circuited. The short circuit is at least partially eliminated when the temperature of the component exceeds a threshold or limit value. An electrical circuit including the component and a method for increasing the inductance of an electrical component having a conductor, are also provided.

26 Claims, 10 Drawing Sheets

(56) References Cited

U.S. PATENT DOCUMENTS

| | | | | |
|---|---|---|---|---|
| 4,016,523 A * | 4/1977 | Sidor | .................. | H01H 37/764 |
| | | | | 337/403 |
| 4,377,541 A * | 3/1983 | Bobik | ...................... | B22F 5/10 |
| | | | | 264/617 |
| 4,482,801 A * | 11/1984 | Habata | .................... | H05B 3/14 |
| | | | | 156/273.7 |
| 5,123,662 A * | 6/1992 | Sugimura | .............. | F16J 15/062 |
| | | | | 277/584 |
| 5,793,278 A * | 8/1998 | Pohl | ........................ | H01C 1/14 |
| | | | | 338/32 R |
| 6,388,553 B1 * | 5/2002 | Shea | ...................... | H01C 7/126 |
| | | | | 337/167 |
| 9,130,477 B2 | 9/2015 | Marquardt | | |
| 2008/0070788 A1 | 3/2008 | Kramer et al. | | |
| 2008/0130184 A1 * | 6/2008 | Hartmann | ................. | H01C 3/02 |
| | | | | 361/93.7 |
| 2010/0245022 A1 * | 9/2010 | Galla | .................. | H01H 37/761 |
| | | | | 337/159 |
| 2012/0243282 A1 * | 9/2012 | Marquardt | .............. | H02M 7/49 |
| | | | | 363/132 |
| 2013/0199027 A1 * | 8/2013 | Singh | .................. | A61N 1/3787 |
| | | | | 29/602.1 |
| 2018/0091111 A1 * | 3/2018 | Wennerstrom | .......... | H01F 27/08 |

FOREIGN PATENT DOCUMENTS

| | | | | |
|---|---|---|---|---|
| JP | 2006237221 A | | 9/2006 | |
| JP | 2007274754 A | | 10/2007 | |
| JP | 2007288824 | * | 11/2007 | .............. H02H 9/02 |
| JP | 2007288824 A | * | 11/2007 | |
| JP | 2007288824 A | | 11/2007 | |
| JP | 2009177922 A | * | 8/2009 | |

\* cited by examiner

ELECTRICAL COMPONENT

BACKGROUND OF THE INVENTION

Field of the Invention

The invention relates to an electrical component, and also to a method for increasing the inductance of an electrical component.

Large quantities of energy can be stored in electrical circuits. The energy stores used can be, for example, capacitors, but also batteries or other energy stores. These large quantities of stored energy can create considerable problems in the event of a fault, in particular when the quantities of energy are released in a sudden and uncontrolled manner. In this case, the electrical components of the electrical circuits are often not able to accept the released quantities of energy or reduce said quantities of energy in a controlled manner (for example to convert said quantities of energy into heat). This may then lead to the electrical circuit being damaged or completely destroyed, for example due to an explosion, in the event of a fault. Destruction of this kind may also lead to subsequent damage to other operating means (for example to housings, neighboring elements or buildings). One reason for this is, for example, that electrical arcs or large magnetic current forces can occur owing to the large quantities of energy. Furthermore, high levels of contamination can also occur in the event of a fault.

BRIEF SUMMARY OF THE INVENTION

The invention is based on the object of specifying an electrical component and a method, with which electrical component and method an electrical circuit can be protected against damage or destruction in the event of a fault.

According to the invention, this object is achieved by a component and by a method as claimed in the independent patent claims. Advantageous refinements of the component and of the method are indicated in the dependent patent claims.

The invention discloses an electrical component comprising a conductor which has a plurality of conductor sections, wherein the conductor sections are electrically short-circuited, and the short circuit is (automatically) at least partially eliminated when the temperature of the component exceeds a (component-specific) limit value.

In the case of this component, it is particularly advantageous that (as long as the temperature is below the limit value) the conductor sections are electrically short-circuited. As a result, the conductor sections have only a low non-reactive resistance (which is dependent on the conductor material used) and a low inductance. In general, the conductor sections have only a low impedance in the short-circuited state. As a result, an electrical circuit into which this component is installed is influenced only to a very low extent at temperatures below the limit value. However, the short circuit is advantageously (automatically) at least partially eliminated when the temperature of the component exceeds the limit value. As a result, the properties of the component change (for example the impedance can increase, and in particular the non-reactive resistance and/or the inductance of the component can increase), so that the component can then be used to protect the electrical circuit.

When the temperature of the component is below the limit value, the temperature is in the rated temperature range and rated operation of the component is present. The conductor sections are electrically short-circuited during this rated operation. The conductor sections are electrically inactive on account of the short circuit. In the event of a fault, the temperature of the component (on account of large fault currents which flow through the component occurring) exceeds the limit value. In this case, the short circuit is at least partially eliminated. Therefore, the component has different properties at temperatures below the limit value than at temperatures above the limit value. These different properties are used to protect electrical or electronic circuits.

In other words, the component has a short-circuit eliminating means which at least partially eliminates the short circuit when the temperature of the component exceeds the (component-specific) limit value. The conductor sections have an electrical short circuit and the short-circuit eliminating means is able to at least partially eliminate the short circuit when the temperature of the component exceeds the limit value. The conductor can be, in particular, an elongate conductor. The conductor can comprise at least one metal, in particular copper and/or aluminum.

The component can be realized such that the short circuit is at least partially eliminated when the temperature of the component exceeds the limit value on account of an electric current which flows through the component. In this case, the component is configured such that the temperature of the component exceeds the limit value when an impermissibly high electric current flows through the component. The limit value is component-specific and depends, in particular, on the conductor material used and also on the non-reactive resistance of the conductor in the short-circuited state. The higher this non-reactive resistance of the conductor with short-circuited conductor sections, the higher the temperature increase on account of the electric current which flows through the component.

The component can also be configured such that the component has a first electrical connection and a second electrical connection, the first electrical connection is (electrically) connected to a first end of the conductor, and the second electrical connection is (electrically) connected to a second end of the conductor. The current which flows in an electrical circuit can be fed into the component by means of the first electrical connection and the second electrical connection. Substantially only the non-reactive resistance of a portion of the material of the conductor is active between the first connection and the second connection when conductor sections are electrically short-circuited. No inductance or only a negligibly low inductance is active between the first connection and the second connection when conductor sections are electrically short-circuited.

The component can also be configured such that the conductor sections are each turns of an (in particular spiral) winding. The conductor therefore has a (spiral) winding. When the turns are electrically short-circuited, the turns are electrically inactive.

In this case, the component can also be configured such that the inductance of the component is increased when the short circuit is at least partially eliminated. The turns are electrically active on account of the at least partially eliminated short circuit, and therefore the inductance of the component is increased. The increased inductance can be used to protect the circuit into which the component is installed. In particular, this increased inductance brakes an increase in the current flow through the component.

The component can be configured such that the conductor sections are electrically short-circuited by the conductor sections being uninsulated and the conductor sections bearing against one another. In particular, the respectively adjacent conductor sections bear against one another (along their extent). In addition, the component can have a tensioning apparatus which presses the (adjacent) conductor sections against one another. This results in a very low non-reactive resistance between the first electrical connection and the second electrical connection at temperatures below the limit value.

The component can also be configured such that an expansion material is arranged between the conductor sections (which bear against one another), the volume of said expansion material increasing when the temperature of the component exceeds the limit value. As a result, the conductor sections, in particular the turns, are pushed away from one another, as a result of which the short circuit is at least partially eliminated. In other words, the component comprises the expansion material as a short-circuit eliminating means.

The component can also be configured such that the conductor sections have a first recess for receiving the expansion material and/or a second recess for receiving the expansion material. This first recess and/or this second recess each constitute a receptacle for the expansion material.

In this case, the component can be realized such that the first recess is arranged between two adjacent conductor sections and/or the second recess is arranged between two adjacent conductor sections.

The component can also be configured such that the first recess is arranged on one side of the conductor sections and the second recess is arranged on the opposite side of the conductor sections.

The component can also be realized such that the first recess and/or the second recess are/is a recess which runs (at least in sections) along the conductor sections.

The component can also be configured such that the first recess and/or the second recess are/is a groove which runs (at least in sections) along the conductor sections.

The component can be constructed such that the expansion material comprises a plastic, in particular a polymer, with a positive coefficient of thermal expansion. This plastic is therefore a volume-expanding plastic, in particular a volume-expanding polymer.

The component can also be configured such that the conductor sections are electrically short-circuited by the conductor sections being uninsulated and by an electrically conductive plastic being arranged between the conductor sections. The electrically conductive plastic short-circuits the individual conductor sections in this case, so that only a low electrical impedance, in particular a low non-reactive resistance, of the conductor is active.

The component can also be configured such that the non-reactive resistance of the plastic increases when the limit value for the temperature is exceeded, in particular since the plastic at least partially fuses and/or becomes gaseous. The short circuit is at least partially eliminated owing to the surface melt produced or the gas layer over the surface. In other words, the component comprises, as the short-circuit eliminating means, the plastic of which the non-reactive resistance increases when the limit value for the temperature is exceeded, in particular since the plastic at least partially fuses and/or becomes gaseous.

The invention further discloses an electrical circuit comprising a component of the kind specified above.

The electrical circuit can be configured such that the circuit has an energy store, and the component is arranged in a current path which is electrically connected to the energy store.

The invention also discloses a method for increasing the inductance of an electrical component, wherein the component has a conductor which comprises a plurality of conductor sections, and wherein the conductor sections are electrically short-circuited when the temperature of the component is below a (component-specific) limit value, wherein, in the method, the short circuit is at least partially eliminated when the temperature of the component exceeds the limit value.

The method can also be configured such that the conductor sections are electrically short-circuited by the conductor sections being uninsulated and the conductor sections bearing against one another, and the volume of an expansion material which is arranged between the conductor sections (which bear against one another) increasing when the limit value for the temperature is exceeded. As a result, the conductor sections are moved away (pushed away) from one another, this resulting in the short circuit being at least partially eliminated. In particular, the adjacent conductor sections bear against one another along their extent.

The method can also be realized such that the conductor sections are electrically short-circuited by the conductor sections being uninsulated and by an electrically conductive material, in particular an electrically conductive plastic, being arranged between the conductor sections.

The method can also be executed such that the non-reactive resistance of the material, in particular of the plastic, increases when the limit value for the temperature is exceeded. As a result, the short circuit is at least partially eliminated. In particular, the electrically conductive material is arranged between the adjacent conductor sections along their extent.

The method can also be configured such that the non-reactive resistance of the material (in particular of the plastic) is increased when the limit value for the temperature is exceeded since the material (in particular the plastic) at least partially fuses and/or becomes gaseous. As a result, a surface melt or a gas layer over the surface is produced.

The method can also be executed such that the conductor sections are each turns of an (in particular spiral) winding. When the conductor sections (that is to say the turns) are electrically short-circuited, the turns are electrically inactive. In other words, the conductor can comprise the turns, wherein the turns form the winding.

The method can also be realized such that the inductance of the component is increased when the short circuit is at least partially eliminated. The turns are electrically active on account of the short circuit being at least partially eliminated, this resulting in the inductance of the component being increased.

BRIEF DESCRIPTION OF THE SEVERAL VIEWS OF THE DRAWING

The invention will be explained in greater detail below with reference to exemplary embodiments. To this end.

DESCRIPTION OF THE INVENTION

Figure 1:
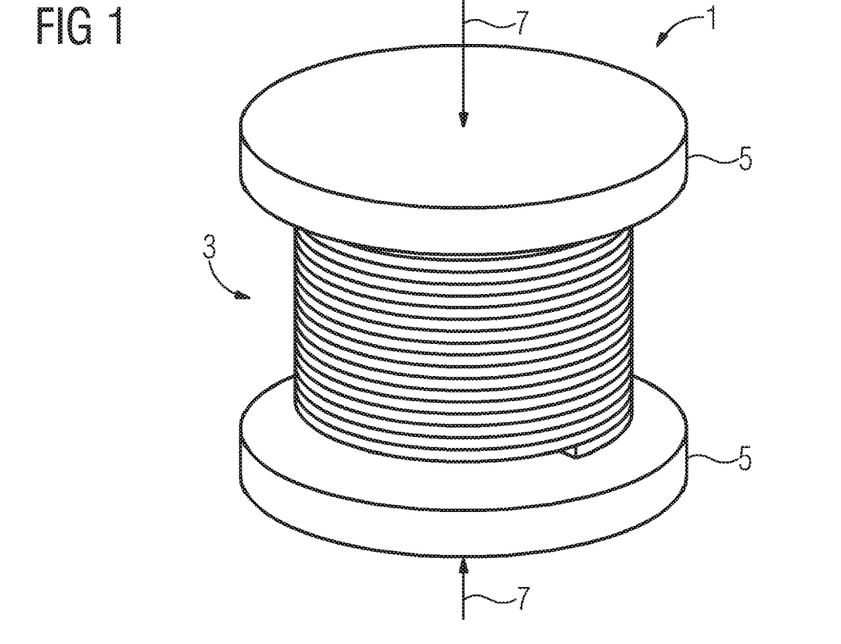
FIG. 1 shows an exemplary embodiment of a conductor comprising a tensioning apparatus.

FIG. 1 is a schematic illustration of a component 1 comprising an electrical conductor 3. The electrical conductor 3 is in the form of a spiral winding 3. This winding 3 has a plurality of conductor sections which are each configured as turns of the winding 3. These conductor sections/turns are braced against one another by a merely schematically illustrated tensioning apparatus 5, that is to say the tensioning apparatus 5 presses the individual conductor sections of the conductor 3 against one another. Forces which are introduced into the conductor by means of the tensioning apparatus and which press the conductor sections/windings against one another are symbolically illustrated by means of arrows 7. The tensioning apparatus 5 ensures that the conductor sections/turns are under a defined mechanical pretensioning and are reliably electrically short-circuited during rated operation. On account of the pretensioning, the turns bear against one another without gaps and are reliably contact-connected to one another.

The tensioning apparatus has two pressure plates 5 between which the conductor sections are clamped. This produces a tensioning system. In addition, the electric current can be introduced into the component by means of the pressure plates. However, as an alternative, separate busbars can also be used for introducing current. The tensioning apparatus 5 has been omitted from each of FIGS. 2 to 16 for reasons of clarity. Nevertheless, tensioning apparatuses of this kind are also used in the exemplary embodiments of each of FIGS. 2 to 16.

Figure 2:
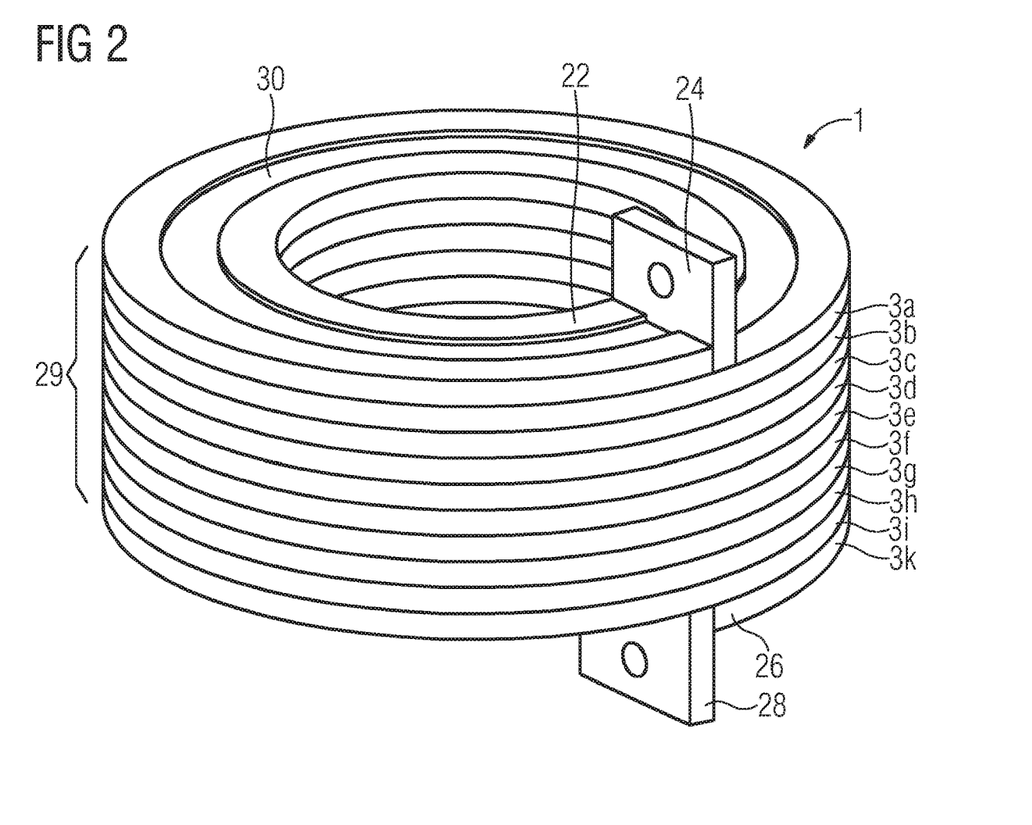
FIG. 2 shows the conductor from FIG. 1 with electrical connections visible.

The conductor 3 from FIG. 1 is illustrated without the tensioning apparatus 5 in FIG. 2. Said FIG. 2 clearly shows that a first end 22 of the conductor 3 is electrically connected to a first electrical connection 24 of the component. Similarly, a second end 26 of the conductor 3 is electrically connected to a second electrical connection 28 of the component. The component 1 can be connected to current paths of an electrical circuit by means of the first electric connection 24 and the second electrical connection 28. The component 1 then serves to protect the electrical circuit in the event of a fault. The first electrical connection 24 and the second electrical connection 28 are each in the form of a screw connection.

Furthermore, FIG. 2 clearly shows that the electrical conductor 3 has a series of conductor sections 3a to 3k. These conductor sections 3a to 3k are illustrated as turns 3a to 3k of a spiral winding 29 in the exemplary embodiment. Therefore, the conductor 3 has ten conductor sections in the form of ten windings 3a, 3b, 3c, 3d, 3e, 3f, 3g, 3h, 3i and 3k in the exemplary embodiment. Furthermore, FIG. 2 shows that the conductor 3 has a first recess 30. This first recess 30 is configured as a groove 30 in the exemplary embodiment. The first recess 30 serves to receive an expansion material. Although the first recess 30 is shown only for the first conductor section 3a, the other conductor sections 3b to 3k also have a recess of this kind. The first recess 30 is therefore arranged between adjacent conductor sections in each case. This first recess 30 runs along the conductor sections and forms a spiral recess along the spiral conductor in the exemplary embodiment.

In mechanical terms, the component can be fastened, for example, to the first connection 24 or to the second connection 28. As an alternative, the component can also be held on the tensioning apparatus 5.

Figure 3:
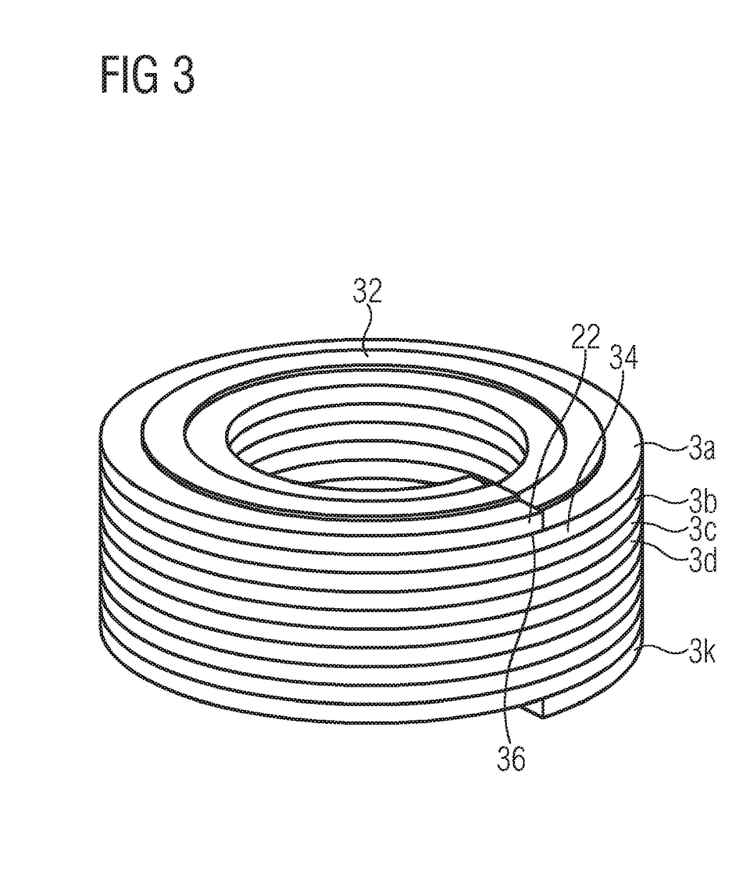
FIG. 3 shows the conductor at a temperature below the limit value.

FIG. 3 shows the conductor 3 from FIG. 2 without the first electrical connection 24 and without the second electrical connection 28. In contrast to the illustration of FIG. 2, the first recess 30 is provided with an expansion material 32 in the illustration of FIG. 3. The expansion material 32 fills the first recess 30 and therefore (like the first recess 30) forms a spiral strand which is composed of expansion material and is arranged, in particular, between the adjacent conductor sections 3a, 3b etc. In the illustration of FIG. 3, the expansion material 32 projects beyond the end-face boundary surface of the conductor sections because the conductor 3 has a recess on both sides, compare FIGS. 5 and 6.

In FIG. 3, the conductor 3 is illustrated during normal operation/rated operation, that is to say the current which flows through the conductor 3 is less than a maximum permissible current (rated current). Therefore, the conductor 3 is only slightly heated by this rated current, and therefore the temperature of the conductor lies below a component-specific limit value. (The component-specific limit value for the temperature can be, for example, 100° C. or 120° C.; the limit value can have different values depending on the rated operation temperature of the circuit.) The expansion material 32 is in its initial form which is illustrated in FIG. 3, that is to say the volume of the material has not increased; the material has not expanded. The individual conductor sections 3a to 3k each make contact with the adjacent conductor section (outside the first recess 30); the individual conductor sections are not pressed against one another by the tensioning apparatus 5 (not illustrated). As a result, the individual conductor sections 3a, 3b etc. are electrically short-circuited, that is to say these conductor sections are not fully electrically active. By way of example, the first end 22 of the conductor 3 (which also constitutes a first end of the first conductor section 3a) makes contact with the second end 34 of the first conductor section 3a. As a result, the first conductor section 3a is electrically short-circuited, there is a short circuit 36. The electric current flows directly and in a straight line from the first end 22 to the second end 34; said current does not flow along the wound first conductor section 3a. This also applies in the same way for the other conductor sections 3b, 3c, 3d etc. The current which flows from the first electrical connection 24 to the second electrical connection 28 therefore flows substantially in a straight line on the shortest path from the first connection 24 to the second connection 28. In particular, the current does not flow in a spiral manner along the spiral winding 29, and therefore the component 1 has no inductance or only a negligibly low inductance.

In the exemplary embodiment, the expansion material 32 is a plastic, in particular a polymer, with a positive coefficient of thermal expansion. This means that the volume of the expansion material increases when said expansion material is heated above the limit value. A plastic with a high positive coefficient of thermal expansion, for example a polyethylene, is preferably used for the component 1. The expansion material can therefore be a volume-expanding plastic. The volume of the expansion material 32 increases considerably (with respect to its initial form or the initial volume) as soon as the temperature of the component exceeds the limit value. In other words, the expansion material 32 expands to a great extent when the limit value for the temperature is exceeded.

Figure 4:
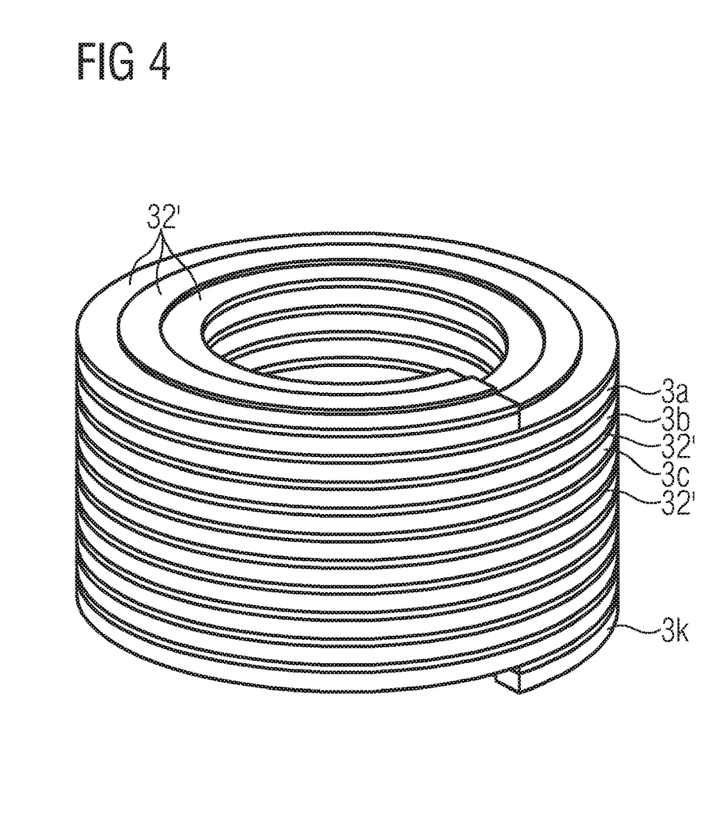
FIG. 4 shows the conductor at a temperature above the limit value.

FIG. 4 illustrates the conductor 3 at overcurrent (that is to say at a current which is greater than the rated current). The conductor 3 has been heated to a great extent on account of the overcurrent, and therefore the volume of the expansion material 32 has increased: an expansion material 32' of increased volume (expanded expansion material 32') is present. The volume of the expansion material 32 has expanded; the expansion material 32' has swollen as it were. Owing to this increase in volume, the expansion material 32' pushes the individual conductor sections 3a, 3b etc. away from one another and fills the resulting intermediate spaces between the individual conductor sections. The expansion material 32' forms an insulating strip in the state in which the volume of said expansion material has increased, said strip running between the individual conductor sections and electrically insulating said individual conductor sections from one another. The expansion material 32 is electrically non-conductive, that is to say is an electrical insulator, both in the state shown in FIG. 3 in which the volume of said expansion material has not increased and in the state shown in FIG. 4 in which the volume of said expansion material has increased.

In practice, the increase in volume of the expansion material 32 often does not take place as uniformly and homogeneously as illustrated in FIG. 4. This means that, in practice, the expanded expansion material 32 may possibly be somewhat thicker at one point than at the other point, and therefore the conductor 3 no longer has a uniform spiral shape (as illustrated in FIG. 4). The illustration of the exemplary embodiments is merely intended to illustrate the principle here—this also applies for the other figures.

Figure 5:
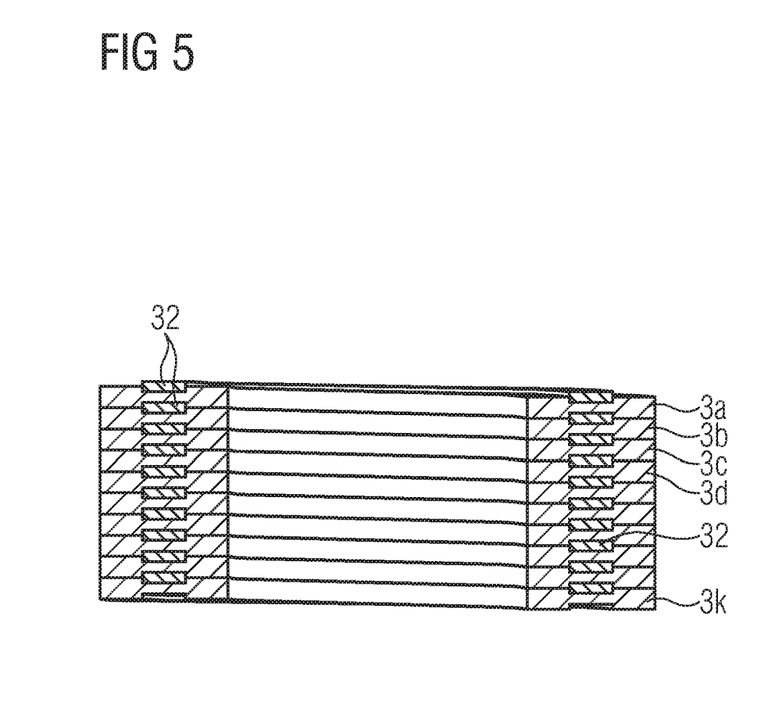
FIG. 5 shows a sectional illustration through the conductor according to FIG. 3.

FIG. 5 shows a sectional illustration through the conductor according to FIG. 3 with the expansion material in the non-expanded state.

Figure 6:
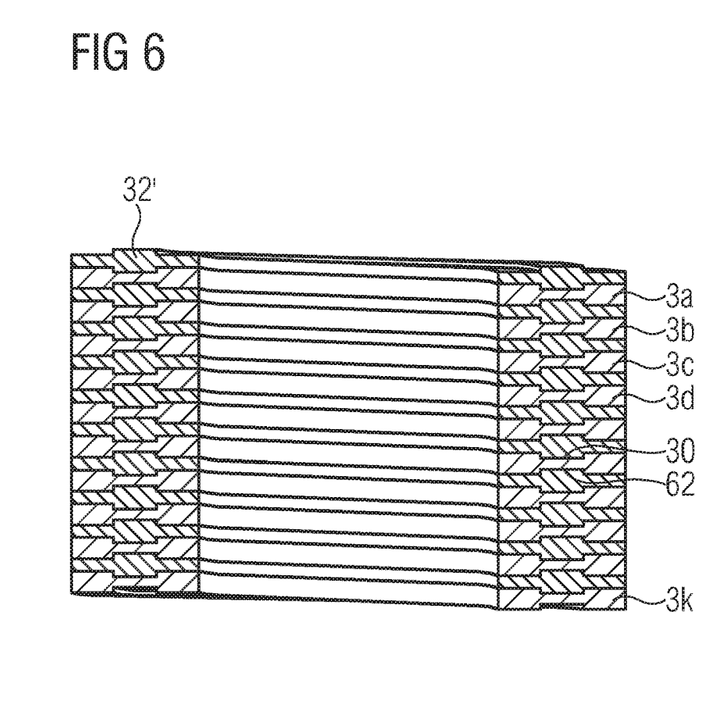
FIG. 6 shows a sectional illustration through the conductor according to FIG. 4.

FIG. 6 shows a sectional illustration through the conductor according to FIG. 4 with the expansion material in the expanded state (that is to say in the event of a fault).

In particular, FIG. 6 clearly shows that the individual conductor sections 3a, 3b, etc. comprise the first recess 30 and a second recess 62. In this case, the first recess 30 is arranged on one side of the conductor sections and the second recess 62 is arranged on the opposite side of the conductor sections. Each conductor section therefore has two recesses: the first recess 30 on one side and the second recess 62 on the other side. As a result, a large amount of space is available for the expansion material 32 in the first recess 30 and in the second recess 62 when said expansion material is in the non-expanded state. Both the first recess 30 and the second recess 62 are respectively arranged between two adjacent conductor sections. The first recess 30 and the second recess 62, which is situated opposite said first recess, can also be called a double recess or double groove.

Figure 7:
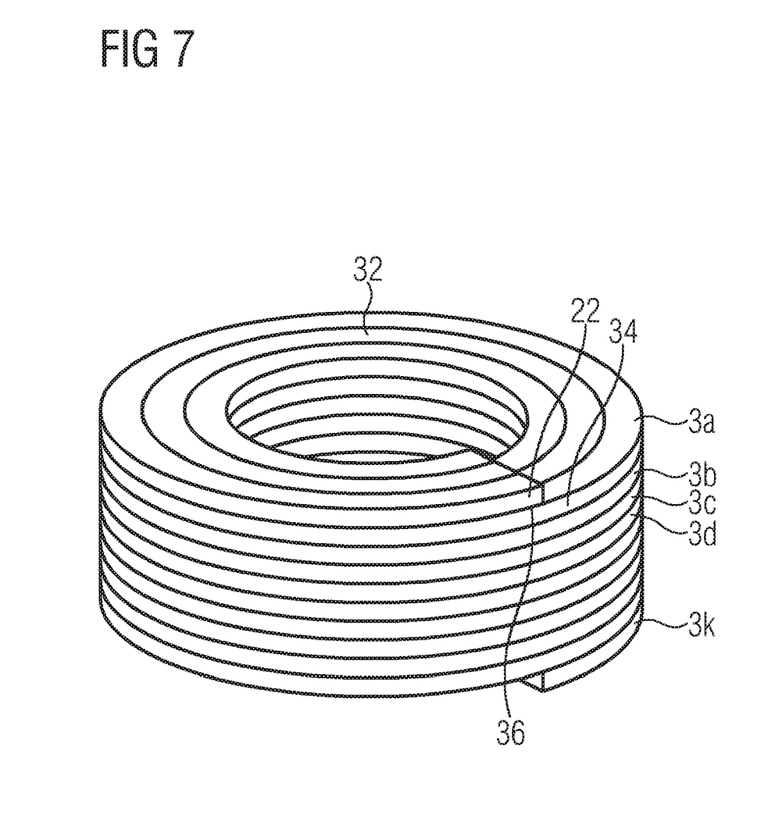
FIG. 7 shows a further exemplary embodiment of a conductor at a temperature below the limit value.

FIG. 7 shows a conductor 3 which (in contrast to FIGS. 3 to 6) comprises only a first recess 30, but not a second recess 62. This is shown in FIG. 7 by the expansion material 32 not projecting beyond the surface of the first conductor section 3a.

Figure 8:
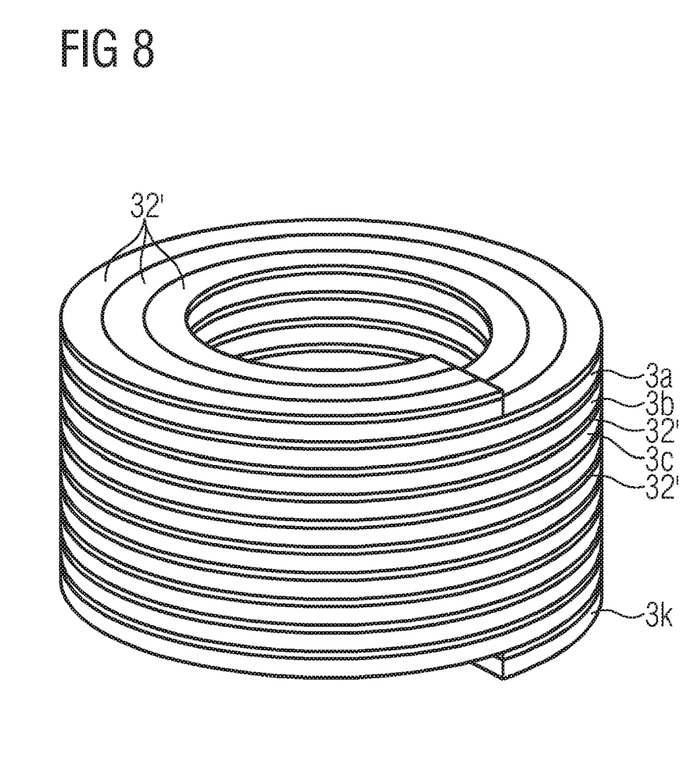
FIG. 8 shows the conductor according to FIG. 7 at a temperature above the limit value.

FIG. 8 shows the conductor of FIG. 7 in the event of a fault (that is to say at temperatures greater than the limit value). Said FIG. 8 clearly shows that the expansion material 32 has expanded and the individual conductor sections 3a, 3b, 3c etc. (i.e. the turns 3a, 3b, 3c etc. of the spiral winding 29) are pushed away from one another.

Figure 9:
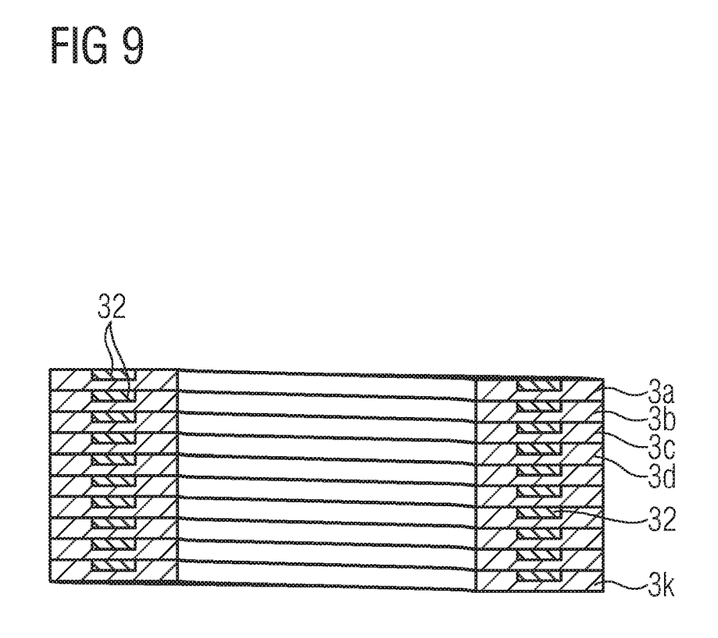
FIG. 9 shows a sectional illustration through the conductor according to FIG. 7.

FIG. 9 shows a sectional illustration through the conductor according to FIG. 7 during rated operation.

Figure 10:
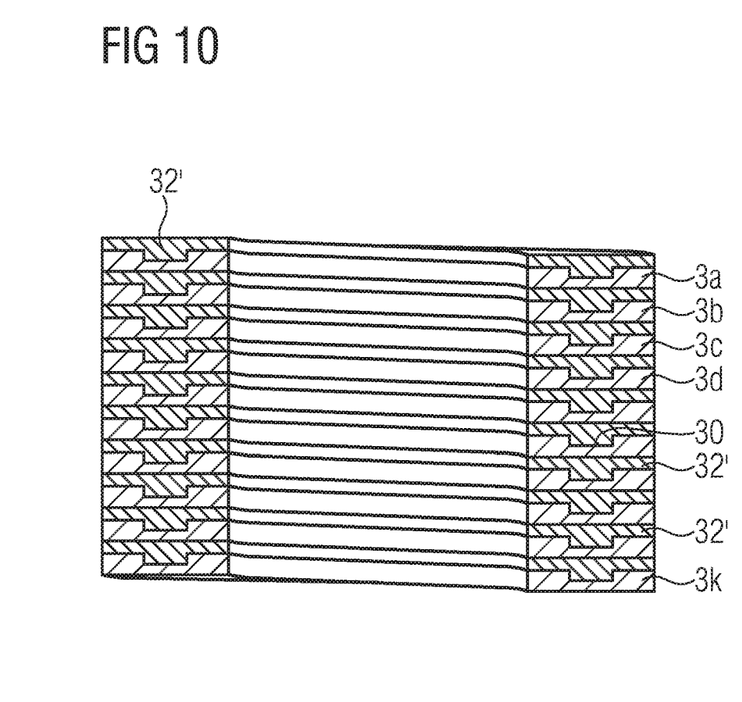
FIG. 10 shows a sectional illustration through the conductor according to FIG. 8.

FIG. 10 shows a sectional illustration through the conductor according to FIG. 8 in the event of a fault.

FIG. 10 clearly shows that each conductor section 3a, 3b, 3c etc. comprises only the first recess 30, but not the second recess 62. This component therefore comprises only one single recess (single recess, single groove).

A further exemplary embodiment of a detail of the component is illustrated in FIGS. 11 to 16.

Figure 11:
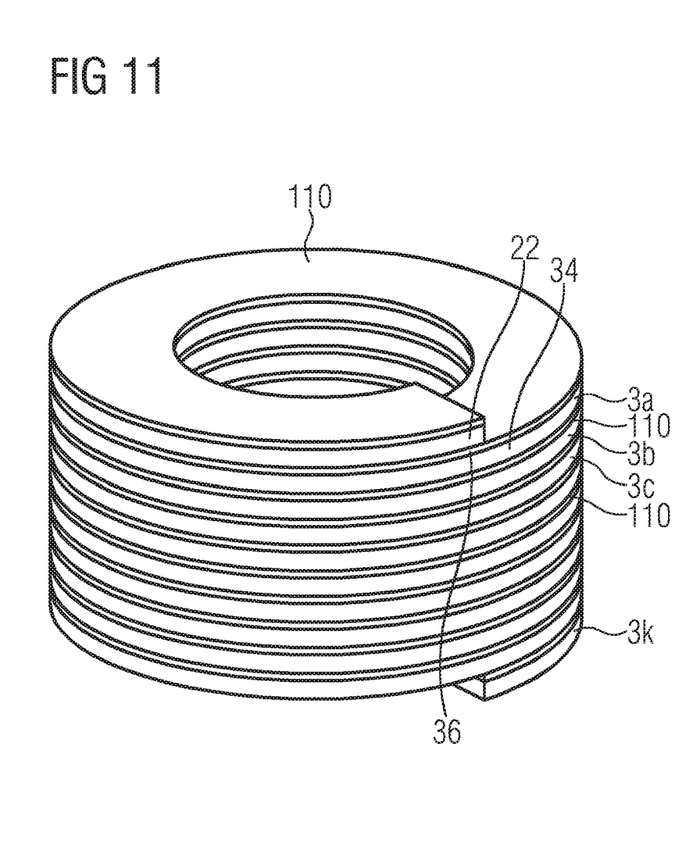
FIG. 11 shows a further exemplary embodiment of a conductor at a temperature below the limit value.

FIG. 11 shows (similarly to in FIG. 3) the conductor 3 which has ten conductor sections 3a to 3k. However, in contrast to FIG. 3, the conductor sections of FIG. 11 do not have any recesses. Instead, an electrically conductive material 110, in particular an electrically conductive plastic 110, which electrically conductively connects the individual conductor sections 3a, 3b, 3c etc. to one another is located between the conductor sections 3a to 3k.

The individual conductor sections are electrically short-circuited by means of this electrically highly conductive material 110.

The electrically highly conductive material 110 can be, for example, an electrically conductive plastic. This plastic may be, for example, a plastic comprising graphite, a plastic comprising metal dust, or a plastic comprising carbon nanotube material. This material may be, for example, an electrically highly conductive plastic, in particular a highly conductive polymer, as is known from published document DE 43 30 607 A1. One example of a polymer of this kind is polyethylene which has been admixed with graphite.

The individual conductor sections 3a to 3k are pressed against one another by the tensioning apparatus 5 (not illustrated). The individual conductor sections 3a, 3b etc. are electrically short-circuited by the conductive material 110 which is arranged between the conductor sections, that is to say these conductor sections are not fully electrically active. By way of example, the first end 22 of the conductor 3 (which is also the first end of the first conductor section 3a) is electrically connected to the second end 34 of the first conductor section 3a by means of the conductive material 110. As a result, the first conductor section 3a is electrically short-circuited, there is a short circuit 36. The electric current flows directly and in a straight line from the first end 22 to the second end 34; said current does not flow along the wound first conductor section 3a. This also applies in an identical manner for the other conductor sections 3b, 3c, 3d etc.

FIG. 11 shows the component during rated operation, that is to say at rated current (which is lower than the maximum permissible current). During rated operation, the electric current therefore flows substantially in a straight line on the shortest path from the first connection 24 to the second connection 28 (not illustrated in FIG. 11, cf. FIG. 1). In particular, the current does not flow in a spiral manner along the spiral winding 29, and therefore the component 1 has no inductance or only a negligibly low inductance. The individual turns 3a, 3b, 3c etc. of the spiral winding 29 are therefore not fully electrically active.

Figure 12:
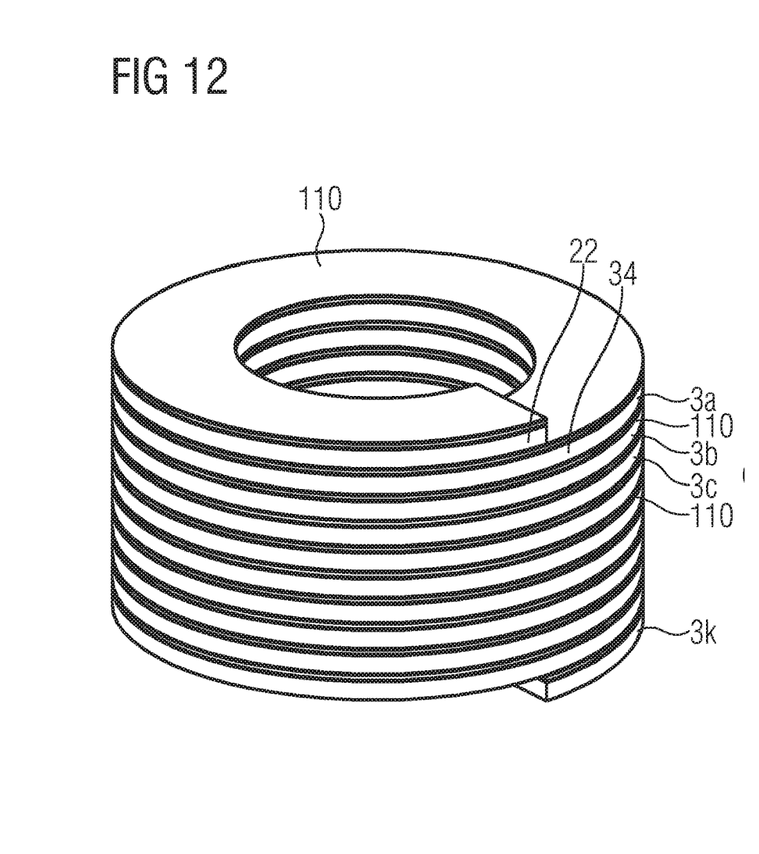
FIG. 12 shows the conductor according to FIG. 11 at a temperature above the limit value.

FIG. 12 shows the conductor according to FIG. 11 in the event of a fault, that is to say at overcurrent and therefore at a temperature which is greater than the component-specific limit value (overtemperature). The electrically conductive material 110 has not appreciably expanded at this overtemperature, and therefore the arrangement according to FIG. 12 has approximately the same volume as the arrangement according to FIG. 11. However, the non-reactive resistance of the electrically conductive material 110 has increased on account of the overtemperature, a highly resistive material is present. The non-reactive resistance increases because the electrically conductive material 110 partially fuses and/or even becomes partially gaseous on account of the high temperatures. In particular, the processes of fusing and evaporation take place at the surface of the electrically conductive material and therefore at the interface between the electrically conductive material and the conductor. The partially fused and/or gaseous material 110 is indicated with thicker lines in FIG. 12 than in FIG. 11.

The non-reactive resistance of the electrically conductive material is greatly increased at high temperatures on account of a surface melt being produced or even gas evolution arising at the surface. As a result, the electrical short circuit between the individual conductor sections (and therefore also the electrical short circuit 36 mentioned by way of example) is at least partially removed, so that the electric current now no longer flows on a straight path between the two electrical connections 24 and 28. Instead, the electric current flows on a spiral path from the first connection 24, via the first end 22, via the spiral winding 29 and via the second end 26, to the second connection 28. Therefore, the conductor sections or windings 3a, 3b, 3c, etc. are electrically active to a greater extent, and the inductance of the component is considerably increased.

Figure 13:
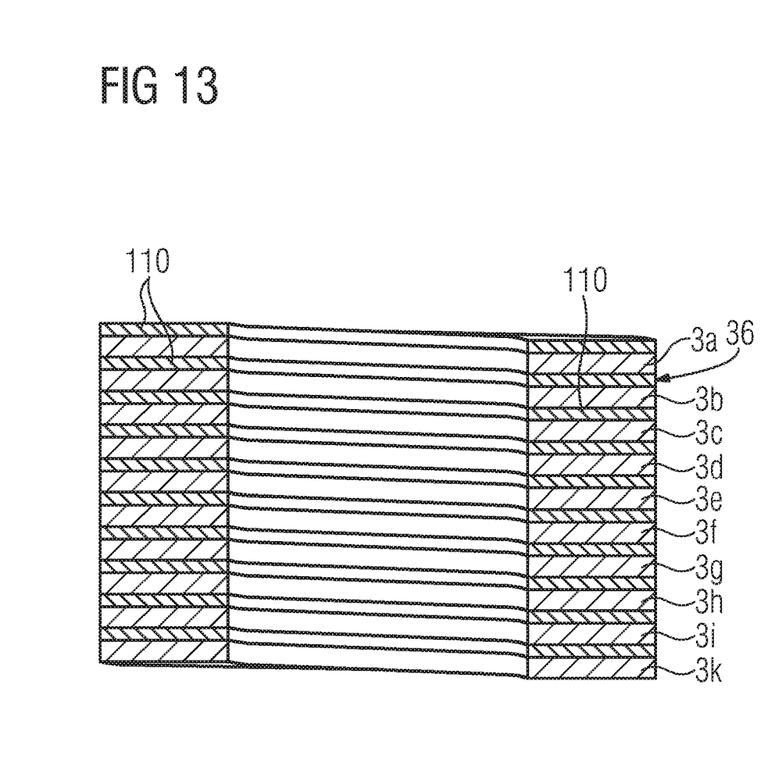
FIG. 13 shows a sectional illustration through the conductor according to FIG. 11.
Figure 14:
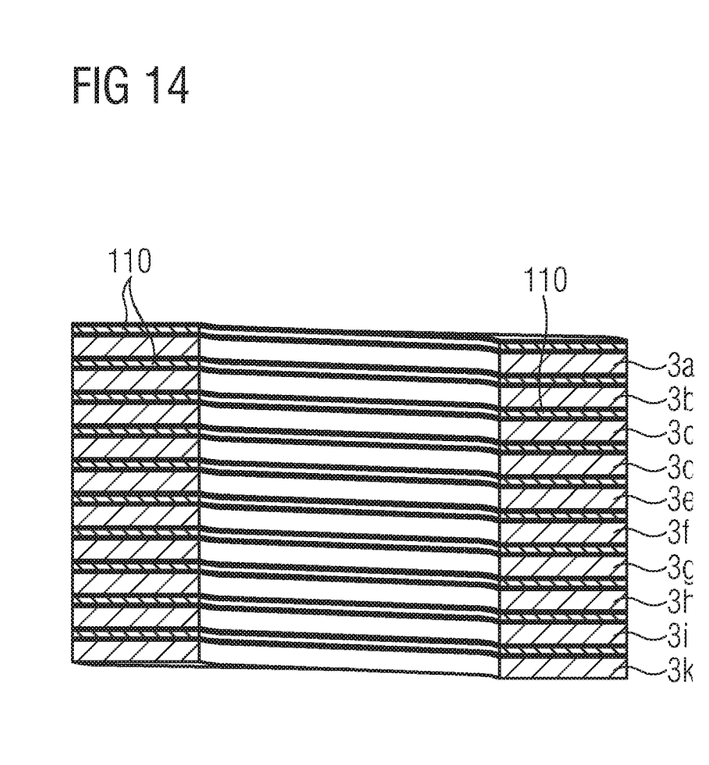
FIG. 14 shows a sectional illustration through the conductor according to FIG. 12.

FIG. 13 shows a sectional illustration through the conductor according to FIG. 11; FIG. 14 shows a sectional illustration through the conductor according to FIG. 12.

Figure 15:
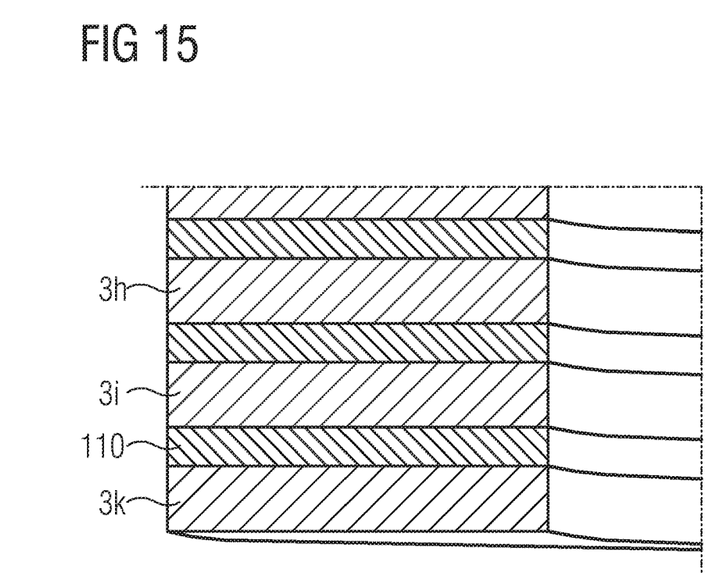
FIG. 15 shows an enlarged detail from FIG. 13.
Figure 16:
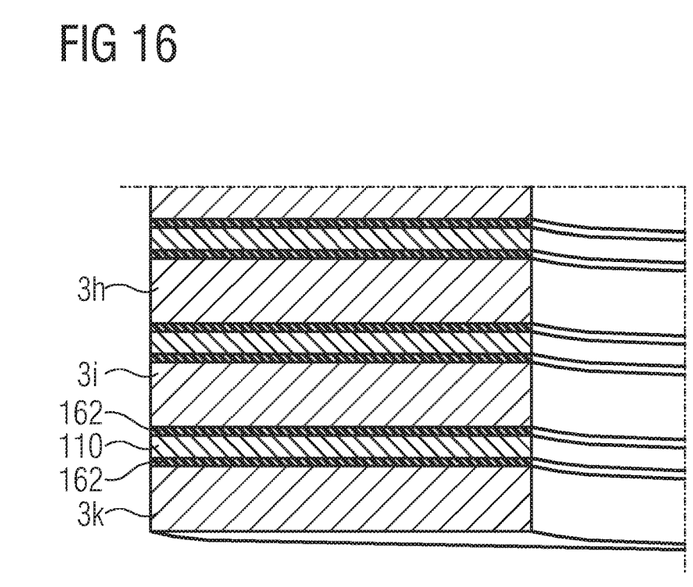
FIG. 16 shows an enlarged detail from FIG. 14.

FIGS. 15 and 16 respectively show an enlarged detail of FIGS. 13 and 14 (the bottom left-hand corner in each case). From amongst said figures, FIG. 16 clearly shows that the electrically conductive material 110 (in particular the electrically conductive plastic) is fused at its surface, and therefore a layer 162 of molten material is visible. The material 110 may even already be partially evaporated over the surface; in this case, the layer 162 constitutes a surface vapor layer or a surface gaseous layer of the material.

Therefore, the following method is executed in the case of the component 1 according to FIGS. 2 to 10: the individual conductor sections 3a, 3b, 3c, etc. are pressed against one another by the tensioning apparatus 5 and are electrically short-circuited as a result. During rated operation (that is to say at rated current), the component heats up only slightly on account of its only low non-reactive resistance. The temperature of the component is below the component-specific limit value. The volume of the expansion material 32 does not increase or increases only negligibly and remains within the intended recesses 30 and/or 62. The conductor sections 3a, 3b, 3c, etc. remain in their electrically short-circuited state.

In the event of a fault situation occurring, an impermissibly high current flows through the component 1. As a result, the component heats up and the temperature of the component exceeds the component-specific limit value. In the event of faults with very high fault currents, said heating-up process takes place very quickly, for example within a few microseconds or milliseconds. By way of example, cases are feasible in which a current of 1000 A flows through the component during rated operation, but a current of 1 million A flows through a component in the event of a fault. Therefore, the permissible current is exceeded by a few powers of ten here, and therefore the temperature of the component rises above the limit value extraordinarily quickly (and also rises far above the limit value). On account of the component heating up suddenly in this way, the volume of the expansion material 32 increases suddenly and pushes the conductor sections 3a, 3b, 3c, etc. away from one another. As a result, the short circuit of the conductor sections is (entirely or partially) removed, this resulting in the conductor sections becoming (entirely or partially) electrically active. As a result, the inductance of the component increases considerably and the component counteracts the sudden increase in current on account of the now increased inductive reactance. In this way, the component limits the current in the event of a fault.

The method is executed as follows in the case of the component according to FIGS. 11 to 16: during rated operation, the conductor sections 3a, 3b, 3c, etc. are electrically short-circuited by the electrically conductive material, in particular by the electrically conductive plastic. In the event of a fault, the material (in particular at its surface) fuses owing to the (rapid and intense) increase in temperature, said material may even partially evaporate. As a result, the electrical conductivity of the material is drastically reduced, this resulting in the short circuit of the conductor sections being entirely or partially removed. The further procedure corresponds to the procedure explained above in connection with the component according to FIGS. 2 to 10.

Figure 17:
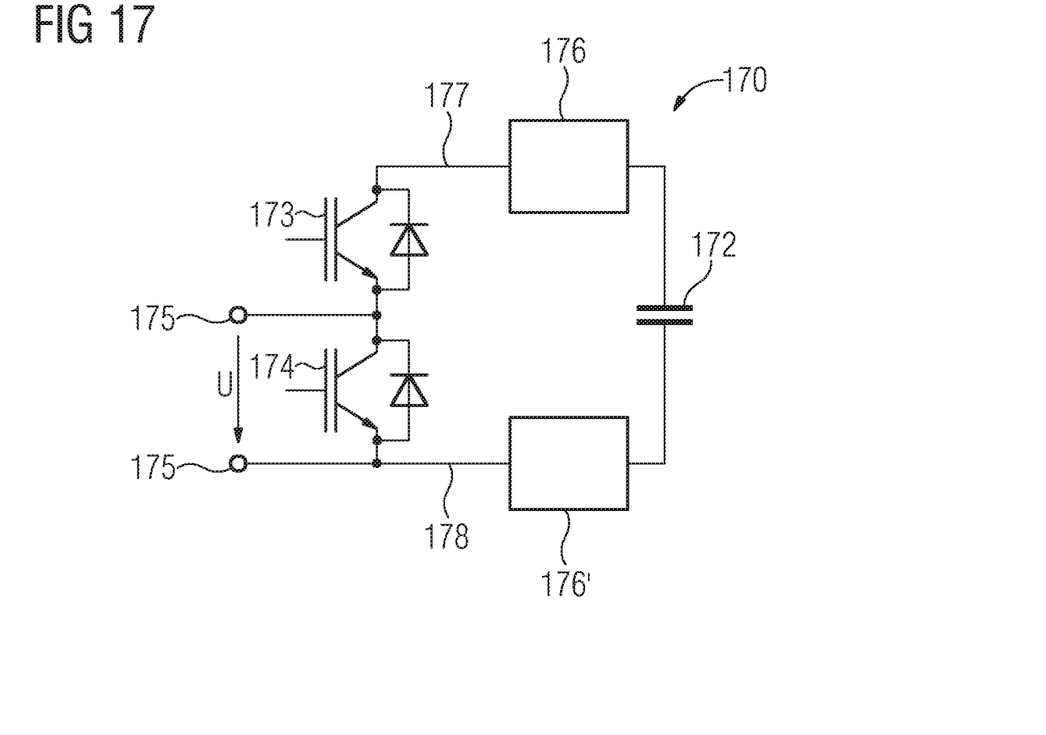
FIG. 17 shows an exemplary electrical circuit in the form of a half-bridge comprising the component.

FIG. 17 shows an exemplary embodiment of a first electrical circuit 170 which has an energy store 172 in the form of a capacitor 172. Furthermore, the circuit has a first electrical switch 173 and a second electrical switch 174. The first electrical switch 173 and the second electrical switch 174 are each configured as an IGBT (Insulated Gate Bipolar Transistor) in the exemplary embodiment. A first freewheeling diode is connected back-to-back parallel to the first electrical switch 173; a second freewheeling diode is connected back-to-back parallel to the second electrical switch 174. The first electrical switch 173 and the second electrical switch 174 form an electrical half-bridge.

When the first electrical switch 173 is switched on and the second electrical switch 174 is switched off, the voltage of the capacitor and, respectively, the voltage of the energy store 172 are output at connection points 175 as a voltage u. By way of example, the capacitor 172 can be charged to voltages between 2 kV and several 100 kV.

In the event of a defect, in particular in the event of a flashover, of the second electrical switch 174, the energy store 172 would suddenly discharge via the first electrical switch 173 and the second electrical switch 174, this resulting in the electrical energy which is stored in the energy store 172 being explosively converted into thermal energy. This would result in damage or destruction of the first electrical circuit 170. In order to protect against damage/ destruction of this kind, a component of the kind described by means of FIGS. 1 to 16 is installed into the first electrical circuit 170. This component can constitute a resistance element, a resistance element with an inductor function, a fuse element, a protective element or a protective component. This component is called "protective component" or "component" for short in the text which follows.

The protective component can either be installed as a protective component 176 into the current path 177 which leads to a connection of the energy store 172 or be installed as a protective component 176' into the current path 178 which leads to a second connection of the energy store 172. Therefore, only the protective component 176 or the protective component 176' has to be installed. It is not necessary to install both protective elements 176 and 176'. In general, the protective component is installed into the electrical current path (that is to say the electrical connection) between the energy store and the other components of the circuit. Under rated conditions (that is to say at rated current and consequently a temperature of the protective component below the limit value), the protective component 176 acts only as a very low-value non-reactive resistor and therefore only has an insignificant adverse effect on the functioning of the first electrical circuit 170. In the event of a fault (that is to say when high fault currents and the resulting intensive heating of the protective component 176 occur), the inductance of the protective component 176 increases suddenly and as a result counteracts the rapid increase in current. As a result, the discharging (which is undesired since it is faulty) of the energy store 172 is retarded, and therefore explosive energy conversion is avoided. As a result, both the first circuit 170 and also the area surrounding this circuit (housings, premises, buildings) are protected against damage and/or soiling.

Figure 18:
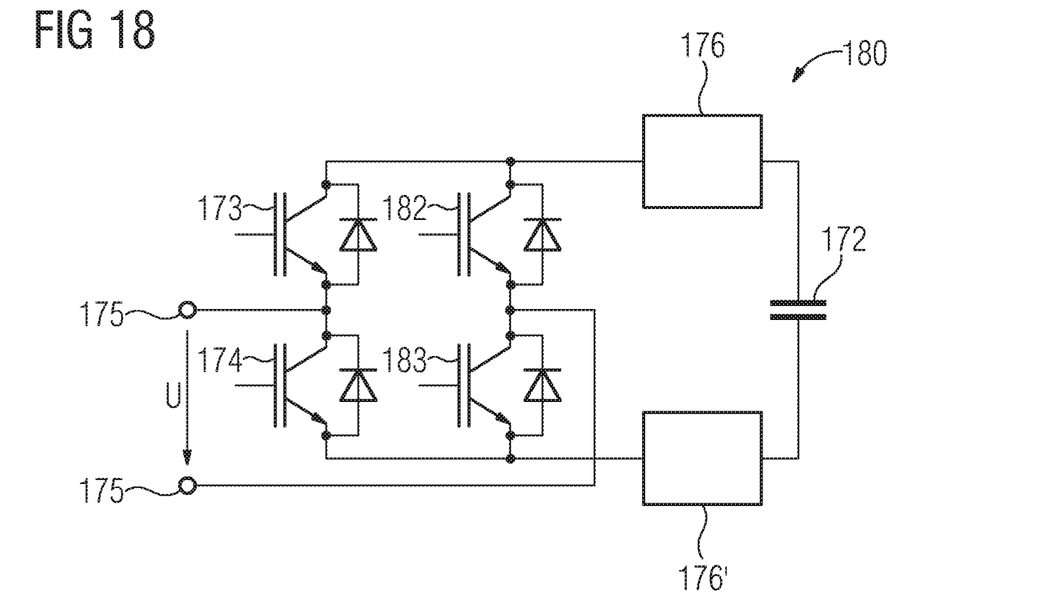
FIG. 18 shows a further exemplary electrical circuit in the form of a full-bridge comprising the component.

FIG. 18 shows a second electrical circuit 180 which is configured as a full bridge with an energy store in the exemplary embodiment. In addition to the energy store 172, the first electrical switch 173 and the second electrical switch 174, this circuit has a third electrical switch 182 and a fourth electrical switch 183. This circuit 180 can also be protected against damage/destruction by a protective component 176 or a protective component 176' in the event of a fault.

Figure 19:
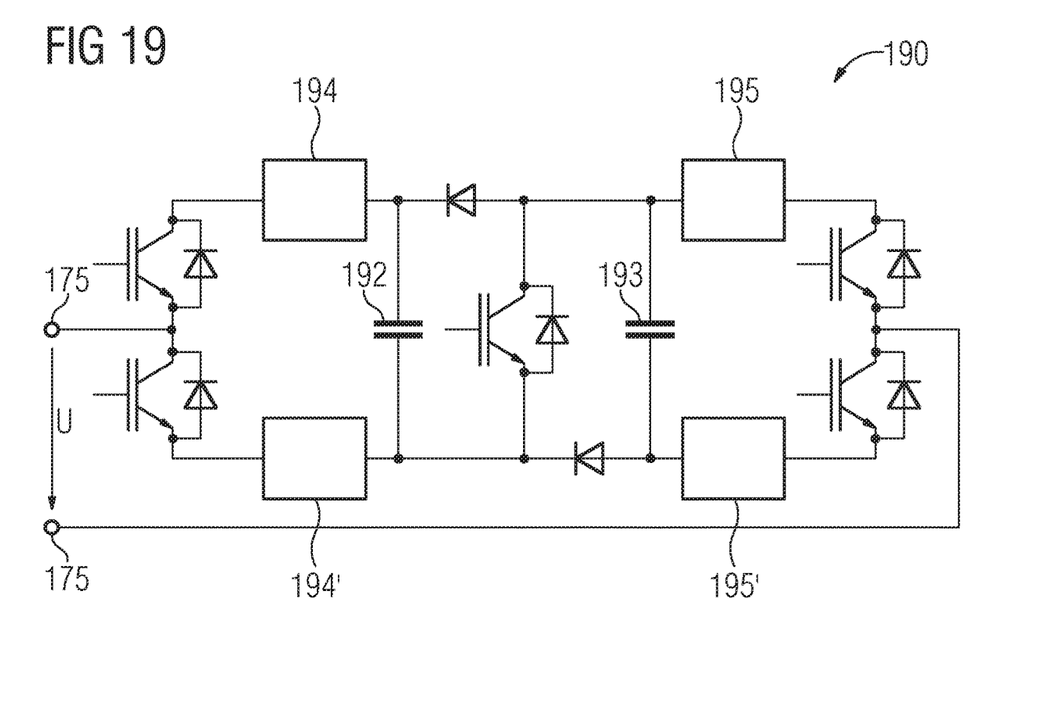
FIG. 19 shows a further exemplary electrical circuit in the form of a double-clamp submodule comprising two components.

FIG. 19 shows a third electrical circuit 190 which forms a so-called double-clamp submodule in the exemplary embodiment. A module of this kind is known from published document DE 10 2009 057 288 A1 "Converter for high voltages". This third electrical circuit has a first energy store 192 and a second electrical energy store 193. The first electrical energy store 192 supplies electrical energy to a first half-bridge (illustrated on the left-hand side of the first electrical energy store 192); the second electrical energy store 193 supplies electrical energy to a second half-bridge (illustrated on the right-hand side of the second energy store 193). The first electrical energy store 192 and the second electrical energy store 193 are connected to one another by means of an additional circuit branch.

This third electrical circuit 190 can be protected by two protective components being inserted into this circuit: either a first protective component 194 and a second protective component 195 are inserted (in the upper circuit branch) or a first protective component 194' and a second protective component 195' are inserted (in the lower circuit branch).

Similarly to the first electrical circuit 170 of FIG. 17, the protective components 194 and 195 (and respectively 194' and 195') are installed between the electrical energy store and the half-bridge which is supplied with energy by the energy store.

Figure 20:
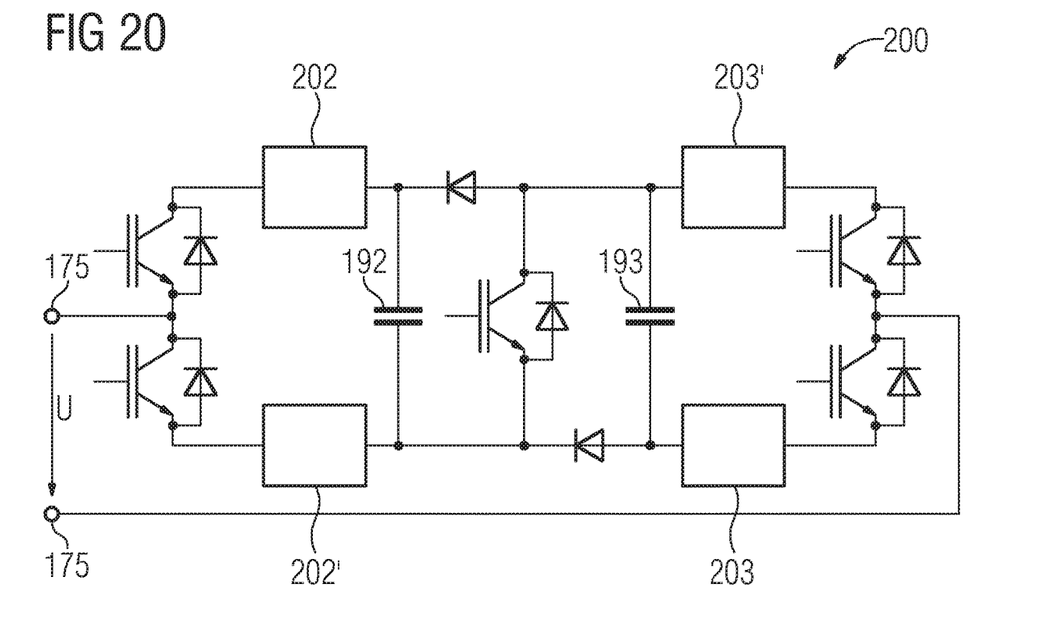
FIG. 20 shows the circuit according to FIG. 19 with the two components in a changed installation position.

FIG. 20 shows a fourth electrical circuit 200 which is of similar construction to the third electrical circuit 190. In contrast to the third electrical circuit 190, the protective components are arranged diagonally: either the fourth electrical circuit 200 has a first protective component 202 and a second protective component 203 or the fourth electrical circuit 200 has a first protective component 202' and a second protective component 203'.

Therefore, only one protective component is required for each half-bridge or each full-bridge. In the case of the double-clamp module, a protective component is required for each half-bridge.

The invention describes an electrical component and a method with which a rapid increase in current can be effectively counteracted. For example, circuit parts or circuits can therefore be protected against damage and destruction. The component is connected in series with the power path (power current path).

Fault situations which are associated with a rapid increase in current can occur, for example, in high-voltage DC transmission systems (HVDC transmission systems). For example, a bridge short circuit can occur in half-bridge modules, full-bridge modules or double-clamp modules. Therefore, it is possible for failure of a semiconductor switch to switch to lead, for example, to a complete bridge short circuit, to a direct short circuit or else to a so-called level flashover. The described components can be used in order to keep the damage as low as possible and also to prevent buildings (for example converter halls) from being contaminated with dirt as far as possible here. It is even possible for the component to reliably manage stored amounts of energy which are so large that they cannot be controlled by a passive protection means (such as, for example, an explosion protection cell which surrounds the semiconductor switches). The described component can be used in addition to other protective elements which are known as such, for example in addition to thyristors which are connected parallel to the current path (so-called crowbar thyristors), in addition to resistor/inductive combinations which are connected in series or in addition to fuses which are connected in series.

In other words, the component has a wound coil former which, during rated operation, acts merely as a minimal non-reactive resistor on account of outer mechanical bracing and on account of the electrically short-circuited conductor sections. The value of this minimal non-reactive resistor is dependent on the material (material resistance) and on the contact transitions at the connections. In the event of a fault (that is to say when high fault currents occur), an electrical inductance is produced in the component, that is to say the component acts as an inductor in the event of a fault. The value of the inductance which becomes effective in the event of a fault can be set by means of the mechanical structure of the component (for example by means of the number of turns, diameter etc. used).

In contrast to normal inductors, the individual conductor sections/turns are not electrically insulated from one another. If, in the event of a fault, arcs were to form between adjacent turns, the number of windings can be increased and as a result the formation of arcs can be counteracted (so-called cathode drop and anode drop of arcs). The mechanical design of the component can also be changed if desired. In the event of a fault, the very high fault current results in a very high degree of energy input into the component in the form of heat. This energy input or this thermal energy is used as a trigger for a secondary reaction. A virtually immediate secondary reaction/immediate triggering can be initiated by virtue of the component being very rapidly heated.

Two different variants of the component have been described. In the first variant, expansion material (also called firing material) is introduced into a groove between the individual turns, wherein this groove can be arranged on one side or both sides of the conductor sections/turns. The expansion material has the property of its volume increasing suddenly in the event of the input of heat/input of energy above a specific limit value. As a result, the force which is applied by an external bracing device or tensioning apparatus (for example spring elements or other mechanical structures) is exceeded, and therefore the individual turns move away from one another. An inductor is formed as a result. The inductance of this inductor then counteracts the fault current and damps the fault current. The expansion material can be irreversible, that is to say it maintains the increased volume even after it has cooled down again. In this case, the inductance/inductive effect is permanent and the component has to be replaced after the fault. The component can be exchanged together with the entire electrical circuit or it can also be exchanged individually.

In the second variant of the component, the conductor sections/turns are short-circuited by means of an electrically highly conductive material. This material may be, for example, an electrically highly conductive plastic, in particular a highly conductive polymer. During rated operation, the component has essentially only a low non-reactive resistance. In the event of a fault, the plastic fuses at its surface, that is to say it becomes liquid or a liquid/vapor mixture forms, when it is intensively heated up. As a result, a very thin liquid or vapor-like layer (for example a polymer layer) is produced on the surface of the plastic, and therefore the plastic conducts the electric current less well. This liquid or vapor-like layer increases the resistive portion of the resistance to a great extent and therefore forms an insulation between the individual conductor sections, so that the inductive portion of the component becomes effective, that is to say an inductor element is formed.

An electrical component and a method with which an electrical circuit can be protected against damage or destruction due to sudden discharging of an energy store in the event of a fault have been described.

The invention claimed is:
1. An electrical component comprising:
   a conductor including a plurality of conductor sections;
   said plurality of conductor sections being electrically short-circuited with one another resulting in a short circuit;
   said short circuit being at least partially eliminated when a temperature of the component exceeds a limit value; and
   an expansion material disposed between said conductor sections, said expansion material having a composition that increases in volume when the temperature of the component exceeds the limit value.
2. The component according to claim 1, wherein said short circuit is at least partially eliminated when the temperature of the component exceeds the limit value due to an electric current flowing through the component.
3. The component according to claim 1, wherein:
   said conductor has a first end and a second end;
   a first electrical connection of the component is connected to said first end of said conductor; and
   a second electrical connection of the component is connected to said second end of said conductor.
4. The component according to claim 1, wherein said conductor sections are turns of a winding.
5. The component according to claim 1, wherein an inductance of the component is increased when said short circuit is at least partially eliminated.
6. The component according to claim 1, wherein said conductor sections are uninsulated and said conductor sections bear against one another, causing said conductor sections to be electrically short-circuited.
7. The component according to claim 1, wherein said conductor sections each respectively have a first recess for receiving said expansion material or a first recess and a second recess for receiving said expansion material.
8. The component according to claim 7, wherein at least one of said first recess or said second recess is disposed between two adjacent conductor sections.
9. The component according to claim 7, wherein said first recess is disposed on one side of said conductor sections and said second recess is disposed on an opposite side of said conductor sections.
10. The component according to claim 7, wherein at least one of said first recess or said second recess runs along said conductor sections.
11. The component according to claim 7, wherein at least one of said first recess or said second recess is a groove running along said conductor sections.
12. The component according to claim 1, wherein said expansion material includes a plastic or a polymer with a positive coefficient of thermal expansion.
13. The component according to claim 1, which further comprises:
   an electrically conductive plastic disposed between said conductor sections;
   said conductor sections being uninsulated; and
   said conductor sections being electrically short-circuited due to said conductor sections being uninsulated and due to said electrically conductive plastic disposed between said conductor sections.
14. The component according to claim 13, wherein said plastic has a non-reactive resistance increasing when the limit value for the temperature is exceeded.
15. The component according to claim 14, wherein said plastic at least one of becomes gaseous or at least partially fuses when the limit value for the temperature is exceeded.
16. An electrical circuit, comprising a component according to claim 1.
17. The electrical circuit according to claim 16, which further comprises:
   an energy storage device; and
   a current path electrically connected to said energy storage device;
   said component being disposed in said current path.
18. A method for increasing an inductance of an electrical component, the method comprising the following steps:
   providing the electrical component with a conductor including a plurality of conductor sections electrically short-circuited with one another when a temperature of the component is below a limit value resulting in a short circuit;
   at least partially eliminating the short circuit when the temperature of the component exceeds the limit value;
   placing an expansion material between the conductor sections; and
   increasing a volume of the expansion material when the limit value for the temperature is exceeded.

19. The method according to claim 18, wherein:
the electrical short circuit of the conductor sections is caused by the conductor sections being uninsulated and bearing against one another.

20. The method according to claim 18, wherein the electrical short circuit of the conductor sections is caused by the conductor sections being uninsulated and by an electrically conductive material being provided between the conductor sections.

21. The method according to claim 20, wherein the electrically conductive material is an electrically conductive plastic.

22. The method according to claim 20, wherein a non-reactive resistance of the electrically conductive material increases when the limit value for the temperature is exceeded.

23. The method according to claim 22, wherein the non-reactive resistance of the electrically conductive material is increased when the limit value for the temperature is exceeded due to the electrically conductive material at least one of becoming gaseous or at least partially fusing.

24. The method according to claim 18, wherein the conductor sections are turns of a winding.

25. The method according to claim 18, wherein the inductance of the component is increased when the short circuit is at least partially eliminated.

26. An electrical component comprising:
a conductor including a plurality of conductor sections;
said plurality of conductor sections being electrically short-circuited with one another by the plurality of conductor sections being uninsulated and bearing against one another, resulting in a short circuit;
said short circuit being at least partially eliminated when a temperature of the component exceeds a limit value; and
an expansion material disposed between said conductor sections, said expansion material having a composition that increases in volume when the temperature of the component exceeds the limit value.

* * * * *